Figure 1:
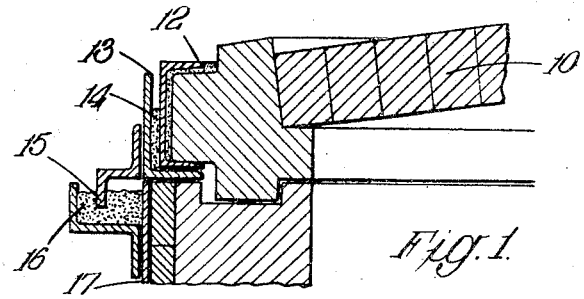

March 16, 1943.  R. NISSIM  2,313,837
ELECTRIC ARC FURNACE WITH REMOVABLE HEARTH OR ROOF
Filed July 21, 1941   3 Sheets-Sheet 1

Inventor
Raoul Nissim
by Malcolm W. Fraser
Attorney

March 16, 1943.  R. NISSIM  2,313,837

ELECTRIC ARC FURNACE WITH REMOVABLE HEARTH OR ROOF

Filed July 21, 1941  3 Sheets-Sheet 2

Inventor
Raoul Nissim
by Malcolm W. Brown
attorney

March 16, 1943.   R. NISSIM   2,313,837
ELECTRIC ARC FURNACE WITH REMOVABLE HEARTH OR ROOF
Filed July 21, 1941   3 Sheets-Sheet 3

Inventor
Raoul Nissim
by Malcolm W. Preuer
attorney

Patented Mar. 16, 1943

2,313,837

UNITED STATES PATENT OFFICE 2,313,837

ELECTRIC ARC FURNACE WITH REMOVABLE HEARTH OR ROOF

Raoul Nissim, London, England

Application July 21, 1941, Serial No. 403,296
In Great Britain March 26, 1940

10 Claims. (Cl. 13—9)

The present invention relates to improvements in electric arc furnaces having removable hearths or roofs.

In the operation of such furnaces it is necessary to charge the furnace every few hours for which purpose the roof is first lifted and then transferred laterally away from the hearth so that the latter can be charged from above, or after the roof has been lifted the hearth is moved laterally in order that it can be charged.

In the normal running of such furnaces it is found also that the roof requires to be repaired or replaced entirely about every twenty days or so and this is an expensive operation since even a repair is a long job because the electrodes are supported from the roof and consequently repairs to the roof are not easily performed.

In known methods of charging furnaces the roof is first lifted by attaching it to a bridge erected over the hearth after which the hearth is run out from under the roof, or the roof is lifted and turned by means of an hydraulic cylinder which in normal working conditions is detached from the furnace to allow tilting of the latter.

In the first above mentioned case the bridge must be strong enough to avoid deformation due both to the heat and to the stresses caused by the heavy weight of the furnace hearth during tilting operations. In the second case, if the furnace is of considerable capacity, the system used presents some difficulties due to the great weight of the roof which is supported on the cantilever principle during its removal.

It is an object of the present invention to provide an electric arc furnace the roof of which can be repaired or replaced comparatively quickly and inexpensively.

Another object is to provide simple and inexpensive means for charging an electric arc furnace.

Yet another object is to prolong the life of the furnace roof.

With these ends in view, and in accordance with the invention, an electric arc furnace comprises a hearth, a roof ring within which is secured a roof relatively displaceable with respect to the hearth to allow charging to be effected from above, and an auxiliary ring, carrying the electrodes and their holders, which is disposed between, and is independent of, the roof ring and the hearth.

Either the roof or the hearth may be made laterally displaceable in order to allow charging to be effected from above, and in both cases the electrodes, their holders, and the roof supported from the auxiliary ring, are moved up to clear the edge of the hearth before the roof or the hearth is displaced.

In operation it is the roof which requires most frequent renewing or repairing, and with the present invention, since the roof is independent of the auxiliary ring carrying the holders, it is as easily removable as in other furnaces.

The roof may rest freely upon the auxiliary ring, so that when the latter is raised the roof is taken with it. In such case the auxiliary ring carrying the roof may be held, during the raising and lowering movements, by an articulated lever system connected both with the auxiliary ring and with the supporting part of the transfer device in such manner that the guiding articulated lever system follows the furnace during its tilting operation.

In the case of a furnace with a laterally displaceable hearth, the roof may be raised by means of three independent lifting devices or by a system of levers or other devices and may be supported by two fixed frames in such manner that the transference of the hearth or the tilting of the furnace can be made with the lifting and supporting device in position. The tilting device may be supported by travelling rocker bases in such manner that the relative positions of the hearth, the rocker bases and the roof-supporting devices are not influenced by the transfer movement of the hearth, thus avoiding the necessity for detaching and attaching the tilting device when the hearth is being transferred.

Preferably means, such as hereinafter described, are provided for interlocking the various controlling devices.

Figure 2:
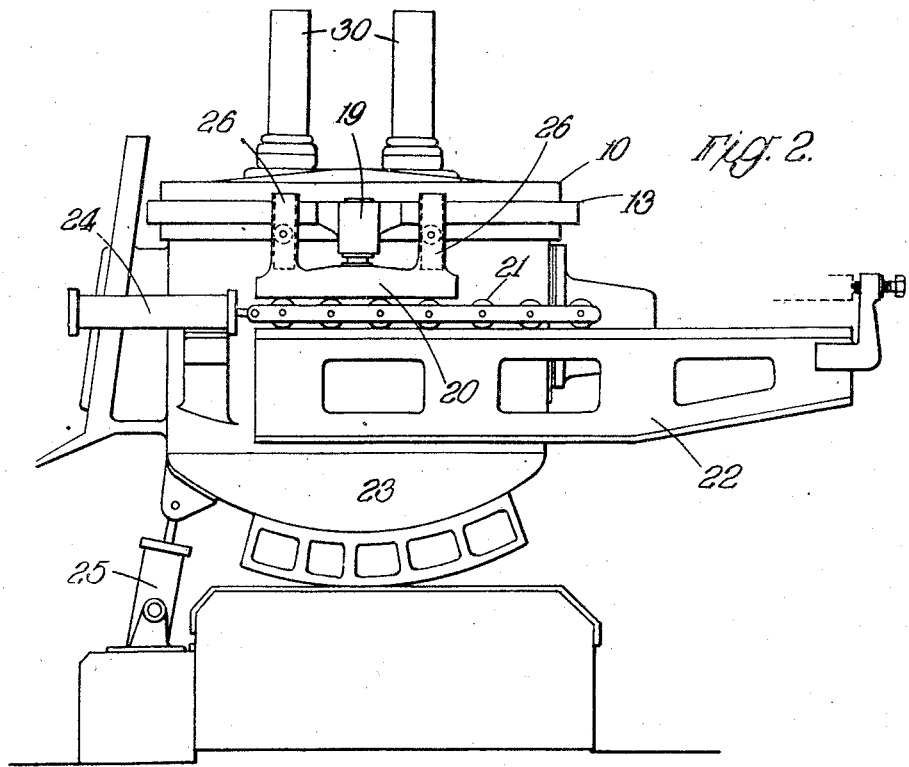

Preferred forms of the invention will now be described with reference to the accompanying diagrammatic drawings in which Figure 1 shows the arrangement for supporting the roof on the hearth, used in all the following examples of the invention, Figure 2 shows a furnace of small capacity with lifting and transferring mechanism for lifting and moving the roof laterally with respect to the hearth.

Figure 6:
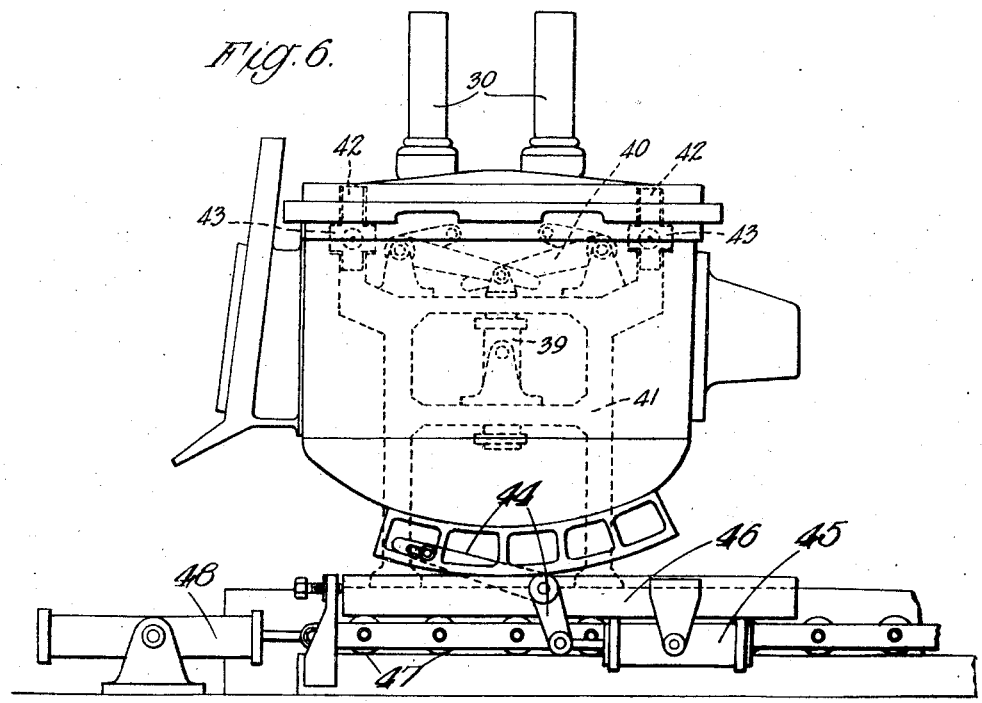
Figure 7:
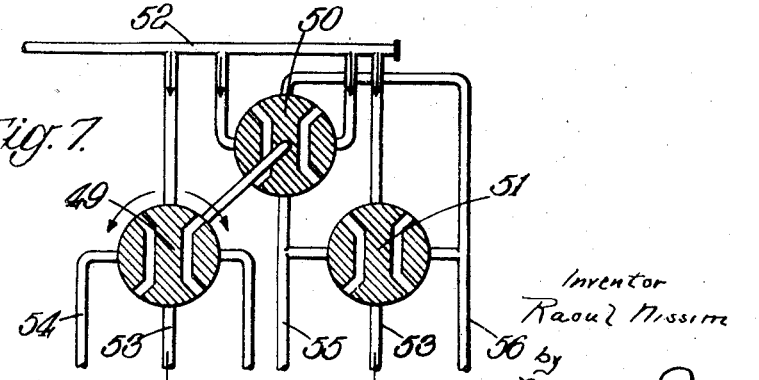
Figure 3:
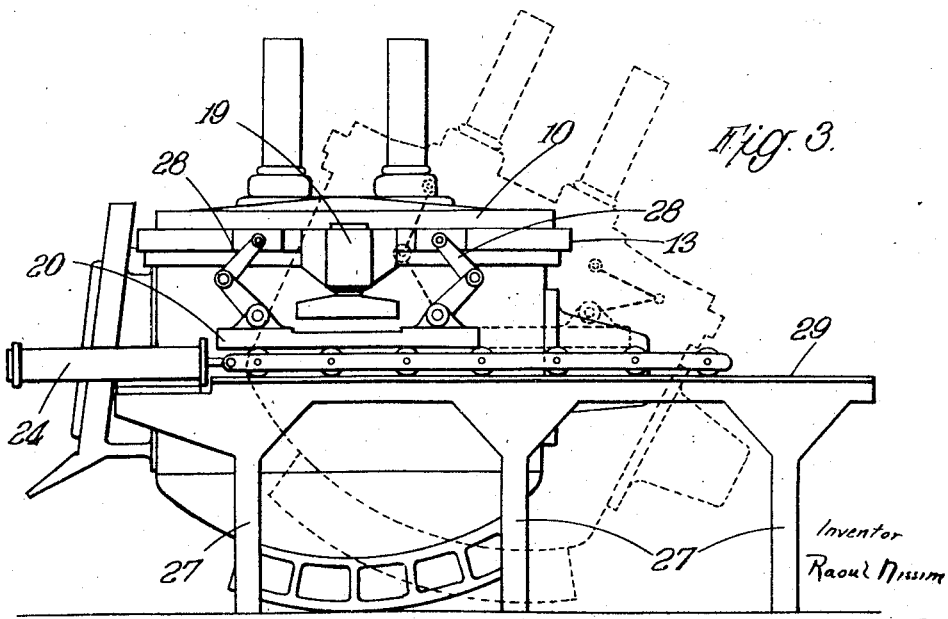
Figure 4:
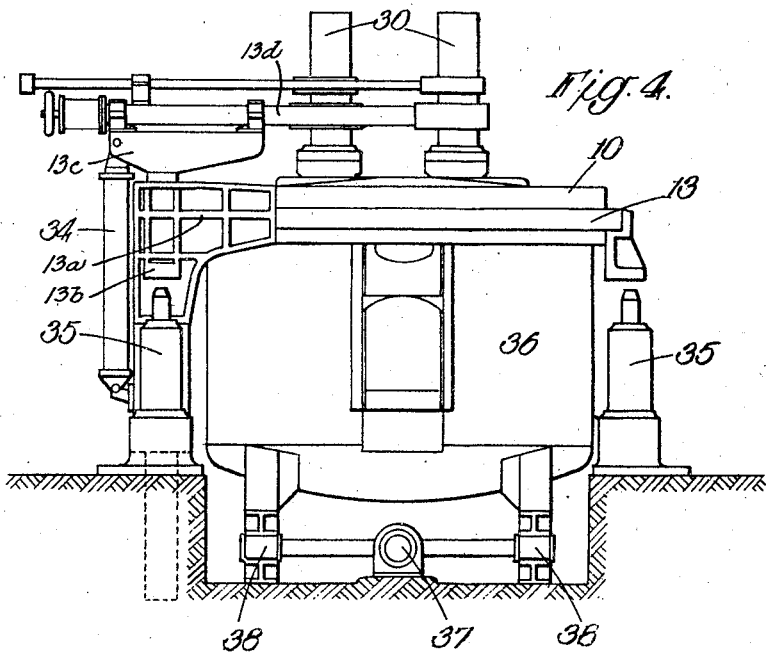
Figure 5:
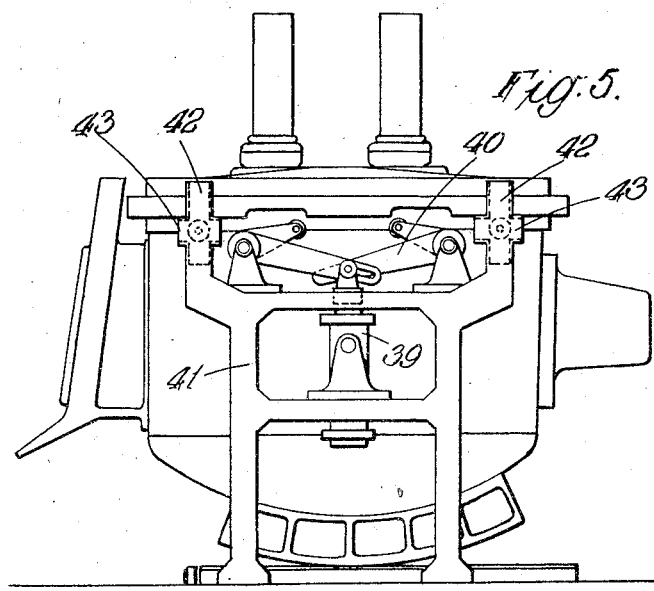

Figure 3 shows lifting and transferring mechanism for a furnace of larger capacity, Figures 4 and 5 are two elevations of mechanism for use in a furnace in which the hearth is moved laterally after the roof has been lifted, Figure 6 is an elevation of a furnace similar to that of Figures 4 and 5 but showing different transfer mechanism, and Figure 7 is a diagrammatic representation of an hydraulic interlock between a transfer cylinder for the roof and the rocking cylinder operating upon the hearth of a furnace with a removable roof as represented in Figures 2 and 3. The same control can be used if the furnaces are moved electrically.

In all of the modifications described herein the roof is supported upon the hearth in the manner illustrated in Figure 1.

As shown in this figure the roof 10 is secured within a peripheral roof ring 12. The roof ring 12 rests freely upon an auxiliary ring 13, and the two rings are separated by a sand seal 14. The electrode-holders and the electrodes are supported upon the auxiliary ring 13. The auxiliary ring 13 is formed with a flange 15 dipping into a sand seal 16 formed on the hearth 17, constituting in its entirety an inverted T section. As illustrated in Figure 1 of the drawings the stem of the T is constituted by the member 13 while the inwardly and outwardly projecting flanges define the cross of the T. The function of the stem of the T is to retain the roof 10; clearance is provided between the stem and the roof ring 12 and this space is sealed by a sand seal 14, sufficient clearance being allowed for relative expansion between the roof and the auxiliary ring. The inwardly extending cross flange of the T section rests freely upon the top of the hearth while the outwardly extending flange serves to receive on its underside means for lifting the roof and the auxiliary ring together. As shown, the auxiliary ring 13 is also formed with a flange 15 dipping into a sand seal 16 formed on the hearth 17.

With this arrangement the roof 10 can move slightly with respect to the auxiliary ring 13, whilst the latter can move relatively to the hearth 17, so that provision is made for relative thermal expansion between these members.

Furthermore, in order to remove the roof, for repair or renewal, all that is necessary is to lift it off the auxiliary ring 13, leaving the latter, and the electrodes carried by it, in place.

Figure 2 illustrates a furnace of small capacity in which the mechanism for transferring the roof is supported upon the hearth. To the roof 10, on opposite sides of the furnace, are attached two hydraulic cylinders or other lifting devices, one of which is shown at 19 and the piston of which bears upon a trolley 20 running on rollers 21 movable on cantilevers 22 carried upon the sides of the furnace hearth 23. After it has been lifted, the roof is displaced laterally, to allow of charging, by means of an hydraulic cylinder 24 or other device, and the furnace as a whole is rocked for pouring by means of a cylinder 25.

In operating the furnace for charging, the cylinders 19 are operated to raise the auxiliary ring 13 carrying the roof 10 off the hearth 23, whereupon the cylinder 24 is operated to transfer the auxiliary ring 13, the electrodes 30 and the roof 10 along the cantilevers 22. When the roof has been returned to a position above the hearth, pressure is released in the cylinders 19 and the auxiliary ring with the roof descends under its own weight into its normal position. While the roof is being raised and lowered it is kept in position by guides 26 attached to the trolley 20.

The arrangement shown in Figure 3 is somewhat similar to that of Figure 2 except that the mechanism for transferring the roof is supported upon pillars 27 which are independent of the furnace, whilst the roof 10 is held in place by a system of articulated levers 28 as the pair of cylinders (one of which is shown at 19) lift the roof 10. As before, after the roof has been lifted it is transferred by means of an hydraulic cylinder 24 operating upon a trolley 20. When the roof is in place on the hearth and it is desired to tip the furnace for pouring, which may be done in a manner similar to that illustrated in Figure 2, the system of articulated levers 28 deform and simultaneously the trolley 20 moves along rails 29 supported upon the pillars 27. The levers 28 thus remain always attached to the auxiliary ring 13.

The lifting cylinders of Figures 2 and 3 are shown as attached to the roof but they can be attached to the trolley.

Although in all forms of the invention the auxiliary ring carries the electrode holders and their electrodes, the precise structure of such holders may be varied. For this reason they are shown by way of example, only in Figure 4, it being understood that the same or similar holders are intended for use in the forms shown in the other figures of the drawings.

In the illustrated form a bracket 13a projects inwardly from the auxiliary ring 13 and is formed with lower steps or flanges 13b against which the piston and one of the hydraulic cylinders 35 is brought to bear in lifting the furnace roof through the medium of the auxiliary ring. The electrode holders are supported upon a boom 13c carried by a T-shaped mast 13d slidable vertically in a hollow pillar 13e. In the form shown, when it is desired to lift the roof the electrodes 30 are raised to a sufficient height by means of their control cylinders, one of which is shown at 34. The auxiliary ring 13 carrying the electrodes 30 and the roof 10 is then lifted up by means of three hydraulic clyinders, two of which are shown at 35. The hearth 36, which runs upon rollers 38, is then transferred by means of an hydraulic cylinder 37 or other device.

In the arrangement shown in Figure 5 the auxiliary ring and roof are lifted by means of a pair of cylinders (one of which is shown at 39) operating upon a pair of articulated lever systems 40. The cylinder 39 and levers 40 are mounted upon a fixed frame 41 which is independent of the furnace. The frame 41 is formed with vertical guide channels 42 which keep the roof in place (when it is being lifted and lowered) and with horizontal guide channels 43 which allow the furnace to be rocked and the hearth to be displaced laterally.

Figure 6 illustrates rocking mechanism used for tilting a furnace similar to that shown in Figures 4 and 5. As shown in this figure the furnace is rocked by means of a system of simple levers 44 which in turn are actuated by hydraulic cylinders 45 attached to the rocker base 46, which in turn travels upon rollers 47 operated by a hydraulic cylinder 48. It will be apparent that the whole furnace is tilted by means of the cylinder 45 and lever systems 44, whilst after the auxiliary ring and roof have been raised the hearth is transferred by means of the hydraulic cylinder 48.

Tilting can also be effected by means of an hydraulic cylinder and piston connected directly between the traveling base and the hearth, or by any other suitable means. It is desirable, however, that the tilting mechanism, whatever its nature, should be mounted upon the traveling base in order that it need not be detached therefrom during any of the movements of the furnace.

Figure 7 illustrates diagrammatically an hydraulic system for controlling the transferring and deforming cylinders and for interlocking the two systems so that the operation of one is dependent upon the operation of the other. As shown in this figure a hydraulic distributor 49 controls the transfer cylinder (24 of Figure 2, for example) and is mechanically connected with a distributor 50 which serves to interlock a hydraulic distributor 51 with the distributor 49, the distributor 51 controlling the rocking cylinder (25 of Figure 2, for example) of the furnace. As shown in Figure 7 the three distributors are in their neutral positions. Water is supplied under pressure through a pipe 52 and is discharged through the pipes 53. Both the transfer and rocking cylinders are double acting.

The hydraulic control system of Figure 7 is used to operate, for example, the furnace shown in Figure 2 in the following manner:

The cylinders 19 are operated independently of the other two cylinders, to raise the roof of the furnace. When the roof has reached the required height, the transfer operation takes place. For this purpose the distributor 49 of Figure 7 is turned into clockwise direction until pressure pipe 52 is placed in communication with a pipe 54 leading to the appropriate chamber of the double acting transfer cylinder 24, Figure 1, so that the trolley 20 carrying the roof is moved towards the end of the cantilevers 22.

As the distributor 49 is turned for this purpose the interlock distributor 50 coupled with it is simultaneously turned through the same angle, thus placing the pressure pipe 52 in communication with pipes 55 and 56 which lead respectively to the opposite sides of the double acting rocking cylinder 25 of Figure 1. Consequently cylinder 25 is locked and the furnace is prevented from tilting whilst the roof is being transferred, a necessary expedient since the turning moment of the furnace is increased when the roof is moved out to the end of the cantilevers 22.

As mentioned above, when the roof is supported by a frame independent of the furnace as shown in Figure 3, the articulated system of levers guiding the roof during its raising and lowering does not hinder the normal rocking of the furnace. In this case the system of levers is relatively deformed while the trolley 20 is pulled forwards or backwards for the required distance.

An interlock of the same kind as that mentioned above between the rocking cylinder and the transfer cylinder can be used to facilitate the transfer of the truck when the furnace is rocked. Thus, as soon as pressure is applied to the rocking cylinder pressure is simultaneously applied to the transfer cylinder in such a way as to push the truck forwards or backwards for distances corresponding with the movements of the furnace. The hydraulic interlock shown in Figure 7 can be used for this purpose.

It will be appreciated that in any of the systems described above the hydraulic cylinders can be replaced by electrically operating lifting devices used in conjunction with electric control devices.

What is claimed is:

1. Electric arc furnace comprising a hearth, a roof relatively displaceable with respect to the hearth to allow the hearth to be charged from above, an auxiliary ring, carrying the electrodes and their holders, said auxiliary ring having a flange upon which said roof ring is seated and sand seals disposed respectively between the hearth and the auxiliary ring and between the roof and the auxiliary ring, which seals permit slight relative motion between the roof, the auxiliary ring and the hearth such as that due to thermo expansion.

2. An electric arc furnace comprising a hearth, a roof ring within which is secured a roof relatively displaceable with respect to the hearth to allow charging to be effected from above, an L-shaped auxiliary ring having an inwardly directed horizontal flange upon which said roof ring is freely seated and a vertical flange spaced from said roof ring, a sand seal between the said rings, said auxiliary ring further having an outwardly and downwardly directed flange whose lower edge is received within a trough carried adjacent the upper edge of said hearth, and a second sand seal between said trough and downwardly directed flange.

3. A furnace comprising a hearth, a roof adapted to be lifted and lowered, one of said parts being displaceable relatively to the other to allow charging to be effected from above, means for lifting and lowering the said roof and an independent auxiliary ring disposed between the hearth and the roof, said auxiliary ring being formed with an inwardly directed horizontal member adapted to rest upon the hearth, an upstanding member adapted to surround and retain the roof and an outwardly directed member through which said means is effective for raising and lowering the roof.

4. A furnace comprising a hearth, a roof adapted to be lifted and lowered, one of said parts being displaceable relatively to the other to allow charging to be effected from above, means for lifting and lowering the said roof and an independent auxiliary ring disposed between the hearth and the roof, said auxiliary ring including an inwardly directed horizontal member adapted to rest upon the hearth, an upstanding member adapted to surround and retain the roof freely and an outwardly directed member through which said means is effective for raising and lowering the roof, and sand seals disposed respectively between the hearth and the auxiliary ring and between the auxiliary ring and the roof.

5. A furnace comprising a hearth, a roof adapted to be lifted and lowered, cantilevers secured to said hearth, means mounted for movement on said cantilevers and adapted to lift and lower the roof and to displace it laterally relatively to the hearth to allow charging to be effected from above and an independent auxiliary ring disposed between the hearth and the roof, said auxiliary ring including an inwardly directed horizontal member adapted to rest upon the hearth, an upstanding member adapted to surround and retain the roof freely and an outwardly directed member through which said means is effective for raising and lowering the roof.

6. An electric arc furnace comprising a hearth, a roof adapted to be lifted and lowered, one of said parts being adapted to be displaced laterally relatively to the other to allow charging to be effected from above, means for lifting and lowering the said roof, an independent auxiliary ring disposed between the hearth and the roof, said auxiliary ring including an inwardly directed horizontal member adapted to rest upon the hearth, an upstanding member adapted to surround and retain the roof freely and an outwardly directed member through which said means is effective to raise and lower the roof, and electrode holders carried by said auxiliary ring.

7. A furnace compising a hearth, a roof adapted to be lifted and lowered, cantilevers secured to said hearth, hydraulic lifting means mounted for movement on said cantilevers and adapted to lift and lower the roof and to displace it laterally relatively to the hearth to allow charging to be effected from above, an independent auxiliary ring disposed between the hearth and the roof, said auxiliary ring including an inwardly directed horizontal member adapted to rest upon the hearth, an upstanding member adapted to surround and retain the roof freely and an outwardly directed member movable by said hydraulic lifting means to raise and lower the roof and means for transferring the said hydraulic lifting means and the roof supported thereby upon the cantilevers.

8. A furnace comprising a hearth, a roof, an independent auxiliary ring disposed between the hearth and the roof and retaining said roof freely, hydraulic lifting means mounted independently of the hearth and adapted to raise and lower the roof through the medium of said auxiliary ring and means for moving the hearth laterally relatively to the roof after the latter has been raised to permit charging of the furnace from above.

9. A furnace comprising a hearth, a roof adapted to be lifted and lowered, one of said parts being displaceable relatively to the other to allow charging to be effected from above, means for lifting and lowering the said roof and an independent auxiliary ring disposed between the hearth and the roof, said auxiliary ring including an inwardly directed horizontal member adapted to rest upon the hearth, an upstanding member adapted to surround and retain the roof freely and an outwardly directed member adapted to engage with the said roof lifting and lowering means, means for transferring the hearth laterally relatively to the roof when the latter is raised, means adapted to rock the furnace as a whole and control means interconnecting the transferring and rocking means, the arrangement being such that when the transferring means are in operation the rocking means are locked against operation.

10. A furnace comprising a hearth, a roof ring within which is secured a roof relatively displaceable with respect to the hearth to allow charging to be effected from above, means for lifting and lowering said roof, and an auxiliary ring having an inwardly directed horizontal flange upon which said roof ring is freely seated, a vertical flange spaced from said roof ring, and an outwardly directed flange adapted to engage with said roof lifting and lowering means.

RAOUL NISSIM.